United States Patent [19]

Batkiewicz

[11] 4,128,281

[45] Dec. 5, 1978

[54] AUXILIARY AXIAL THRUST BEARING APPARATUS

[76] Inventor: Stephen A. Batkiewicz, 5742 Beechview Dr., Rochester, Mich. 48063

[21] Appl. No.: 789,573

[22] Filed: Apr. 21, 1977

[51] Int. Cl.² .................... F16C 35/04; F16C 19/06
[52] U.S. Cl. ............................. 308/15; 308/26; 308/184 A; 308/189 R; 308/227; 308/237 A; 416/174
[58] Field of Search .................. 308/15, DIG. 3, 139, 308/157, 237 A, 25, 237 R, 26, 28, 35, 72, 140, 149, 174, 184, 189, 207, 228, 191, 141, 144, 147, 150, 145, 152, 158, 159, 227, 229-231; 98/43; 416/174, 500; 415/142, 110, 107

[56] References Cited
U.S. PATENT DOCUMENTS

| 2,854,297 | 9/1958 | Scott et al. | 308/145 |
| 2,988,981 | 6/1961 | Jenn et al. | 98/43 R |
| 3,415,500 | 12/1968 | Pethis | 308/184 R |

Primary Examiner—Trygve M. Blix
Assistant Examiner—Douglas C. Butler
Attorney, Agent, or Firm—William T. Sevald

[57] ABSTRACT

Auxiliary axial thrust bearing apparatus having a case abuttable on a base at one end with the other end supporting an axial thrust bearing. The case and bearing surround the shaft which is to be axially supported. A sleeve, spring or other spacer lie co-axially of the shaft between the bearing and the load or thrust member secured to the shaft. Axial force on the shaft is supported by the apparatus via the case abutting the base and the bearing abutting the load or thrust member on the shaft. The case has a layer of resilient material lying between the bearing and the case and between the case and the base to permit the case and/or the bearing to move to a position of dynamic balance concentric with the dynamic center of balance of the shaft. The resilient layer also damps vibration. A torque arm may extend from the case to the base to resist angular movement of the case relative to the base and/or the end of the case at the base may be serrated to resist relative angular movement.

9 Claims, 6 Drawing Figures

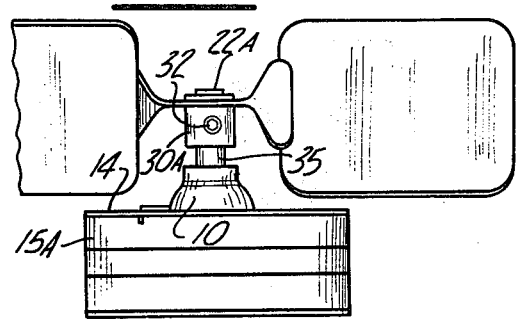
Fig-1
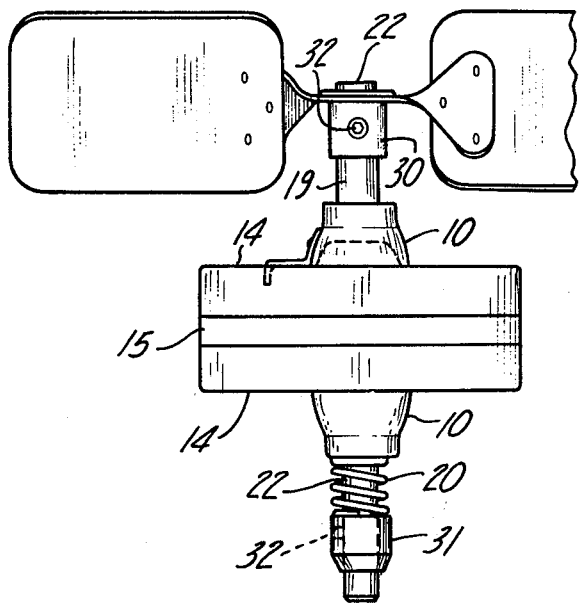
Fig-2
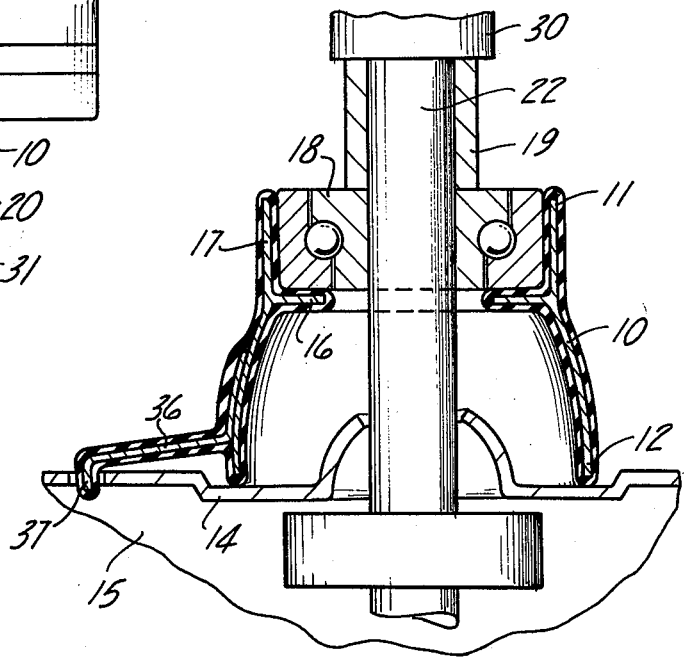
Fig-3
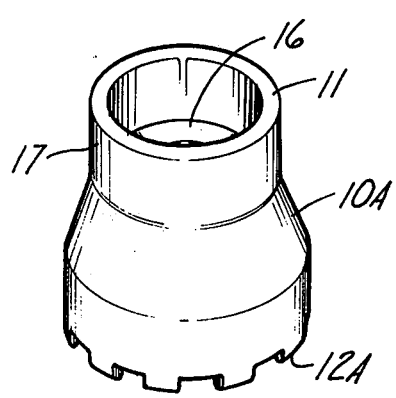
Fig-5
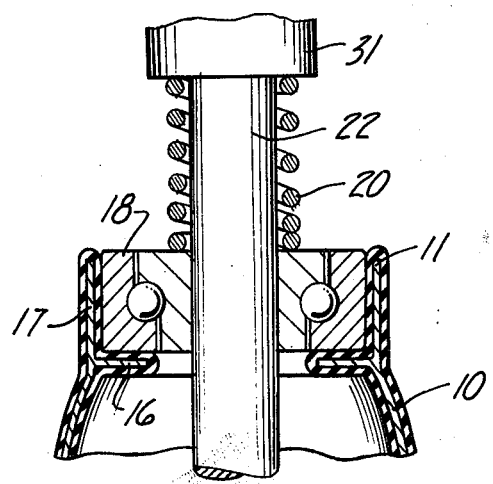
Fig-4
Fig-6

4,128,281

AUXILIARY AXIAL THRUST BEARING APPARATUS

BACKGROUND OF THE INVENTION

Manufacturing motors in the price competitive market is accomplished as inexpensively as possible balanced against quality of structural components for satisfactory performance during a reasonable life span in turn balanced against the selling price of the motor.

One of the basic cost considerations is the cost of bearings and the still larger cost of mounting them. In electric motors, for example, the usual thrust imposed on the drive shaft is in a radial direction because most of the loads imposed on the drive shaft are pulleys which drive belts, saws, etc. Thus the motors are equipped with radial thrust bearings which adequately support radial loads. These radial bearings will support some axial load for short periods, but, when they are operated under axial load for long periods, the radial bearings are insufficient to support the axial load for the same use period as the radial bearings will support a radial load. Usually the imposition of an axial load causes the radial thrust bearings to wear out very quickly requiring replacement of the motor.

Since the integration of axial thrust bearings in a motor is expensive and since in most uses the motors only support radial loads, the manufacturers do not find it economically justified to equip all the motors with axial thrust bearings when they would usually not be used.

However, when a purchaser buys a motor only equipped with radial thrust bearings and imposes an axial load on it for a period and it quickly wears out, he has lost his investment, has to go to the expense of replacing the motor, and if he does not buy a more expensive motor with axial thrust bearings, the same failure happens again.

SUMMARY OF THE PRESENT INVENTION

The invention supplies an answer to the long-felt want for inexpensive, durable, easily mounted, auxiliary axial thrust bearing apparatus which the manufacturer, the retailer and the public alike can mount on the drive shaft of motors to sustain axial loads particularly on motors which originally are equipped only with radial thrust bearings.

The apparatus includes an annular cup-shaped case, open at both ends, which surrounds the shaft, abuts the motor housing at one end of the case, and supports a thrust bearing on the other end of the case. The thrust bearing fits on the shaft. A sleeve or spring surrounds the shaft axially outwardly of the case and the thrust bearing. The sleeve impinges on the inner race of the thrust bearing. The fan hub or other load member then is connected on the outer end of the shaft in abutting relationship to the sleeve or spring. The axial thrust of the load is resisted by the sleeve or spring, the axial thrust bearing, and the case resting on a base, such as the motor housing. The load member itself may contact the bearing.

The case has a resilient coating layer of rubber or synthetic resin which receives and supports the outer race of the bearing and which lies between the case and the housing of the motor. The resilience of the coating layer not only provides a snug resilient seat for the bearing but also provides vibration damping. It also allows the case and the bearing to move relative to one another and to the housing of the motor to provide slight movement to a dynamic center of balance for the case and the bearing on the dynamic center of balance of the motor shaft as supported by the radial thrust bearings of the motor. Thus the auxiliary axial thrust bearing apparatus is in harmony with the radial bearings of the motor.

The structure embodying the invention and its operation will be more apparent from the accompanying drawing and the detailed description of the exemplary embodiments shown in the drawing.

DESCRIPTION OF THE DRAWING

FIG. 1 is a side elevational view of an electric motor having a drive shaft extending at one end with an auxiliary axial thrust bearing assembly on the extending end of the shaft showing the load member fan hub having a projecting portion in contact with the assembly.

FIG. 2 is a side elevational view of an electric motor having a drive shaft projecting at both ends with an auxiliary axial thrust bearing assembly on both projections of the drive shaft.

FIG. 3 is an enlarged axial cross-sectional view of the auxiliary axial thrust bearing assembly seen at the top of FIG. 2.

FIG. 4 is a view similar to FIG. 3, showing the embodiment seen at the bottom of FIG. 2.

FIG. 5 is a top plan or perspective view of the case with the axial thrust bearing removed showing the walls forming the socket for retaining the axial thrust bearing; and FIG. 6 is a view similar to FIG. 5 showing a serrated bottom end on the case.

DETAILED DESCRIPTION OF THE ILLUSTRATED EMBODIMENTS

Referring now to the drawing wherein like reference numerals refer to like and corresponding parts throughout the several views, the novel auxiliary axial thrust bearing assembly disclosed therein to illustrate the invention comprises a cup-shaped case 10. The case 10 has an outer end 11 and an inner end 12. The inner end 12 abuts the housing 14 of the motor 15 for axial support. An annular flange 16 lies internally of the outer end 11 of the case 10. An annular retaining wall 17 on the case 10 surmounts and surrounds the annular flange 16. The flange 16 and the wall 17 form a receiving socket. An axial thrust bearing 18 lies in the socket axially supported on the flange 16 and confined radially by the wall 17. A sleeve 19 or a spring 20, FIG. 2, lies between the bearing 18 and the load member axially supported. The load member may be formed to abut the bearing 18, FIG. 1. The case is preferably entirely coated with a rubber or synthetic resin resilient layer 21.

A fan is shown mounted on one extending end of the drive shaft thrusting axially toward the motor and resisted axially by one auxiliary axial thrust bearing assembly via a sleeve between the fan hub and the assembly. A chuck is mounted on the other extending end of the drive shaft thrusting axially toward the motor in the opposite direction to the fan and resisted axially by the other auxiliary axial thrust bearing assembly via a spring between the chuck and the assembly.

The case 10 and bearing 18 are placed on the shaft 22 of the motor 15 until the inner end 12 of the case 10 abuts the housing 14 of the motor 15, FIG. 3. The sleeve 19 and spring 20, FIG. 2, are then placed on the shaft 22 until they abut the inner race of axial thrust bearing 18.

The fan hub 30, or other load such as the chuck 31, are then placed on the shaft 22 until they abut the sleeve 19 and spring 20 respectively. The set screw 32 in the hub 30 and chuck 31 is then tightened against the shaft 22. In the embodiment shown in FIG. 1, the motor 15A has a shaft 22A extending at one end. The hub 30A has an extending member 35 abutting the inner race of the bearing 18.

In the use of the sleeve 19 or extending member 35, the shaft 22 may be pulled slightly outwardly of the motor 15, 15A while compressing the parts together prior to tightening the set screw 32. In the use of the spring 20 the spring is compressed as desired prior to tightening the set screw 32.

A torque arm 36 may be carried by the case 10. The torque arm 36 has a depending end 37 which is positioned in one of the apertures of the motor housing 14, such as an air vent opening. The torque arm 36 resists relative angular movement between the apparatus and the motor 15. The case 10A, FIG. 6, has a serrated bottom end 12A for engaging the motor housing 14 to resist angular movement between the case 10A and the motor housing 14. The case 10 may be used without a torque arm as shown in FIG. 5. FIG. 5 also provides a perspective view of the portions of the case previously described.

In operation, with the shaft 22, 22A of the motor 15, 15A vertically disposed and the thrust of the fan on the hub 30 directed toward the motor 15, 15A, such as in a ceiling vent fan installation, the weight of the fan and hub 30, the armature and shaft 22, and the thrust of the fan is supported on and resisted by the novel axial thrust bearing apparatus based on the motor housing 14 via the projection 35, sleeve 19 or spring 20, the axial thrust bearing 18, the flange 16 and the case 10.

The showing of FIG. 2 is illustrative of bidirectional auxiliary axial thrust bearing support of the invention at both ends of a motor with two opposed novel assemblies. However, it is to be understood that unidirectional axial thrust bearing support with one novel apparatus at one end of a motor, as shown in FIG. 1 is the more often used embodiment as axial thrust and load on a motor is usually mainly in one direction especially in a single purpose mounting. While an electric motor is shown as illustrative, it will be understood that other uses are within the scope of the invention such as gasoline engines, pumps, drives, transmissions, etc. Also the axial thrust bearing may be a sliding frictional bearing as well as a ball or roller bearing as shown.

The embodiments shown and described are illustrative of the invention and the protective scope of the invention is defined in the appended claims.

I claim:

1. Easily mountable and removable auxiliary axial thrust bearing apparatus for assembly with a bearing housing having a shaft projecting therefrom at at least one end to attach a load member thereon at one end of the shaft, comprising a case having opposite ends;
   one said end of said case being abuttable on the housing associated with the shaft to be supported;
   the other end of said case having walls forming a bearing socket;
   an axial thrust bearing mounted in said walls of said socket; and
   means for impinging axial thrust on said bearing from the load member secured to the shaft;
   axial thrust on the shaft toward the housing being axially supported by said means, said bearing and said case.

2. In apparatus as set forth in claim 1, said means being a sleeve on the shaft between said bearing and the load member on the shaft.

3. In apparatus as set forth in claim 1, said means being a spring on the shaft between said bearing and the load member on the shaft.

4. In apparatus as set forth in claim 1, said means being the abutment of a portion of the load member on said bearing.

5. In apparatus as set forth in claim 1, a torque arm on said case for angularly abutting the housing to resist relative rotation between said case and a housing.

6. In apparatus as set forth in claim 1, said end of said case for abutting the housing being serrated to resist relative rotation between said case and the housing.

7. In apparatus as set forth in claim 1, said walls of said socket having a layer of resilient material lying between said walls and said bearing to damp vibration and to allow movement of said bearing relative to a housing to permit said bearing to achieve dynamic balance compatible with the dynamic balance of the shaft.

8. Easily mountable and removable auxiliary axial thrust bearing apparatus for assembly with a bearing housing having a shaft projecting therefrom at at least one end to attach a load member thereon at one end of the shaft, comprising a case having opposite ends;
   one said end of said case being abuttable on the housing associated with the shaft to be supported;
   the other end of said case having walls forming a bearing socket;
   an axial thrust bearing mounted in said walls of said socket; and
   means for impinging axial thrust on said bearing from the load member secured to the shaft;
   axial thrust on the shaft toward the housing being axially supported by said means, said bearing and said case,
   said one end of said case abuttable on the housing having a coating layer of resilient material lying between said one end of said case and the housing to damp vibration and to allow said case to move to a position of dynamic balance with the dynamic balance of the shaft.

9. Easily mountable and removable auxiliary axial thrust bearing apparatus for assembly with a bearing housing having a shaft projecting therefrom at at least one end to attach a load member thereon at one end of the shaft, comprising a case having opposite ends;
   one said end of said case being abuttable on the housing associated with the shaft to be supported;
   the other end of said case having walls forming a bearing socket;
   an axial thrust bearing mounted in said walls of said socket; and
   means for impinging axial thrust on said bearing from the load member secured to the shaft;
   axial thrust on the shaft toward the housing being axially supported by said means, said bearing and said case;
   in conjunction with a shaft having two ends extending outwardly on both sides of a housing, one said thrust bearing apparatus mounted on one extending end of the shaft and a second said thrust bearing apparatus mounted on the other extending end of the shaft.

* * * * *